(12) United States Patent
Ho et al.

(10) Patent No.: US 11,757,492 B2
(45) Date of Patent: Sep. 12, 2023

(54) SMART LABELS COMPRISING MULTIPLE WIRELESS RADIOS AND METHODS OF OPERATING THEREOF

(71) Applicant: Imprint Energy, Inc., Alameda, CA (US)

(72) Inventors: Christine Ho, Fremont, CA (US); Keith Michael Crane, Alameda, CA (US); Konstantin Tikhonov, San Leandro, CA (US)

(73) Assignee: Imprint Energy, Inc., Alameda, CA (US)

( * ) Notice: Subject to any disclaimer, the term of this patent is extended or adjusted under 35 U.S.C. 154(b) by 0 days.

(21) Appl. No.: 17/525,569

(22) Filed: Nov. 12, 2021

(65) Prior Publication Data

US 2023/0155631 A1    May 18, 2023

(51) Int. Cl.
*H04B 5/00* (2006.01)
*H04W 52/02* (2009.01)
*H04W 4/80* (2018.01)

(52) U.S. Cl.
CPC ......... *H04B 5/0056* (2013.01); *H04B 5/0031* (2013.01); *H04W 4/80* (2018.02); *H04W 52/0229* (2013.01)

(58) Field of Classification Search
CPC ..... H04B 5/0056; H04B 5/0031; H04W 4/80; H04W 52/0229

USPC ....................................................... 455/41.1
See application file for complete search history.

(56) References Cited

U.S. PATENT DOCUMENTS

| | | | |
|---|---|---|---|
| 9,076,589 B2 | 7/2015 | Wright et al. | |
| 2016/0322648 A1* | 11/2016 | Lockett | H01M 6/40 |
| 2017/0144562 A1* | 5/2017 | Thomas | H01M 10/4257 |
| 2020/0365871 A1 | 11/2020 | Smithyman et al. | |
| 2022/0036300 A1* | 2/2022 | Volkerink | H04L 67/12 |
| 2022/0037703 A1* | 2/2022 | Forssell | H02J 7/0013 |

\* cited by examiner

*Primary Examiner* — Eugene Yun
(74) *Attorney, Agent, or Firm* — Polygon IP, LLP (57) ABSTRACT

Described herein are smart labels, each comprising multiple wireless radios, and methods of operating such labels. For example, a smart label comprises a battery and two wireless radios having different power requirements. When the battery is no longer able to support a high-power radio (e.g., NB-IoT), the battery can still power a low-power (e.g., BLE). A battery can be specially configured and/or controlled to support the multi-radio operation of the smart label. For example, a battery can include multiple battery cells with configurable connections among these cells and radios. Furthermore, some battery components can be shared by wireless radios. The battery can also power other components of the smart label, such as sensors (e.g., temperature, acceleration, pressure, package integrity, global positioning), memory, and input/output components. In some examples, multiple smart labels form a mesh network, designed to lower the total power consumption by the radios of these labels.

20 Claims, 12 Drawing Sheets

SMART LABELS COMPRISING MULTIPLE WIRELESS RADIOS AND METHODS OF OPERATING THEREOF

BACKGROUND

Wireless radios can be utilized in various types of devices for transmitting and receiving various types of data. Some examples of such devices include active radio-frequency identification (RFID) tags, smart meters, security sensors, door locks, and wireless cold-chain data loggers. These devices are equipped with batteries for powering these wireless radios and performing other functions. Typically, a device incorporates only one wireless radio. As such, the battery, power management, and functionality are specifically tailored and limited by this one wireless radio. For example, a narrowband internet of things (NB-IoT) radio typically requires power pulses of 1-2 W (e.g., at a voltage of 5V) for its operation. A long-range (LoRa) radio requires pulses of 100-250 mW (e.g., at a voltage of 2.5V), while a Bluetooth low energy (BLE) radio requires pulses of 3-15 mW (e.g., a voltage of 1.5V). When the battery is discharged below the level, at which it can power the radio, the radio can no longer operate. However, the remaining battery capacity is typically quite substantial (e.g., more than 50% of the initial capacity or even more than 75% of the initial capacity) for many types of batteries. Yet this remaining capacity is available only at lower power levels, below the operating requirements of the radio.

What is needed are new methods and systems for power management of smart labels and tags with multiple wireless radios.

SUMMARY

Described herein are smart labels, each comprising multiple wireless radios, and methods of operating such labels. For example, a smart label comprises a battery and two wireless radios having different power requirements. When the battery is no longer able to support a high-power radio (e.g., NB-IoT), the battery can still power a low-power (e.g., BLE). A battery can be specially configured and/or controlled to support the multi-radio operation of the smart label. For example, a battery can include multiple battery cells with configurable connections among these cells and radios. Furthermore, some battery components can be shared by wireless radios. The battery can also power other components of the smart label, such as sensors (e.g., temperature, acceleration, pressure, package integrity, global positioning), memory, and input/output components. In some examples, multiple smart labels form a mesh network, designed to lower the total power consumption by the radios of these labels.

These and other embodiments are described further below with reference to the figures.

DETAILED DESCRIPTION

In the following description, numerous specific details are outlined in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

Wireless radios can be characterized based on their communication protocols, such as near-field communication (NFC), ultra-wideband (UWB), Bluetooth low energy (BLE), long-range (LoRa) radio, narrowband internet of things (NB-IoT), and even satellite. These communication protocols have been developed for different communication needs and require different power levels. For example, a BLE radio is used for meter-range data transmission and requires pulses of 3-15 mW. A LoRa protocol is used for kilometer-range data transmission and requires pulses of 100-250 mW. An NB-IoT protocol—for multi-kilometer-range data transmission and requires pulses of 1-2 W. These power pulses also correspond to different voltage requirements, which are typically higher for higher-power radios.

Described herein are smart labels, each comprising multiple wireless radios, and methods of operating thereof. Specifically, these multiple wireless radios operate using different protocols (e.g., an NB-IoT and a BLE) and have different power requirements (e.g., 1-2 W and 3-15 mW). Each smart label also comprises a battery, formed using one or more battery cells, for powering the radios. In some examples, each battery cell is managed by a controller, configured to select the cell for specific power demands as further described below. The battery is specifically configured and/or controlled to ensure the operation of one or both radios over a long period. For example, when a battery is discharged below a level needed for the operation of a higher-power radio, the battery can be still used to operate a lower-power radio.

Furthermore, a lower-power radio may be used whenever possible (instead of a high-power radio) to preserve the overall battery charge. In some examples, the battery also powers other components of the smart label, such as sensors, memory, power controller, and input/output components. Furthermore, the battery may comprise multiple battery cells. The connections among these battery cells may be specifically configured and/or controlled to provide the power output needed by each wireless radio. Using multiple wireless radios expands the functionality, range, and power management of smart labels, in comparison to, e.g., single-radio labels. Finally, smart labels can be configured to recharge batteries, e.g., wirelessly, while proximate to a charger.

This multi-radio functionality can be demonstrated using a specific example, e.g., a smart label comprising an NB-IoT radio and a BLE radio. In this example, the NB-IoT radio may be used for long-range data transmission, while the BLE radio may be used for short-range data transmission. Since the BLE radio uses less power, the overall battery capacity is preserved when the BLE radio can be used instead of the NB-IoT radio. Furthermore, the NB-IoT communication may not be available due to various external factors (e.g., no external NB-IoT radios are available for communication with the smart label) and/or internal factors (e.g., the battery is discharged below the level at which the NB-IoT radio can be powered). However, even when the battery is discharged below that level, the battery can still power the BLE radio. As such, any data available at the smart level can be still transmitted. Furthermore, multiple smart labels can form a mesh network, in which these smart labels communicate with each other using the lower-power radio (e.g., the BLE radio in the above example). The smart labels can designate one label for external communication using, for example, a higher-power radio (e.g., the NB-IoT radio in the above example). This mesh network approach preserves the total power of all smart labels. In some examples, the external communication designation is switched from one smart label to another (e.g., based on the battery operating parameters).

A smart label may include various features and components for powering multiple wireless radios or, more specifically, for ensuring different levels of power supplied to different wireless radios. In some examples, the smart label comprises a step-down power converter, which allows bringing the voltage (and the power) of the battery to the level needed for each wireless radio. In some examples, a power controller is used to form different types of connections within the smart label (e.g., among multiple battery cells forming one battery and two or more wireless radios). For example, multiple battery cells may be interconnected in-series to power an NB-IoT radio, while only one of these battery cells may be used to power a BLE radio. In other examples, different types of battery cells are used for connecting different wireless radios, e.g., a larger cell is used for an NB-IoT radio, while a smaller cell is used for a BLE radio.

Figure 1A:
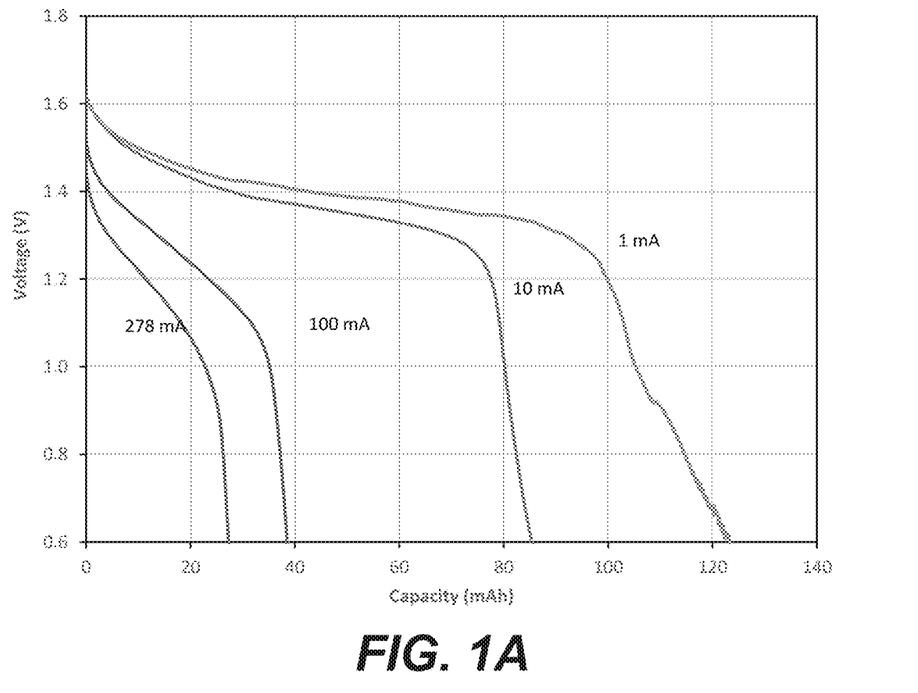
FIGS. 1A and 1B are examples of voltage profiles corresponding to different operating conditions of battery cells.

The battery performance is determined in part by the battery chemistry, design (e.g., size, shape), environmental factors (e.g., temperature), and the like. However, most battery cells have the same general voltage response to the power drawn at different states of charge as, e.g., is shown in FIG. 1A. Specifically, FIG. 1A illustrates a voltage profile as a function of the discharged capacity for four different discharge rates. The discharge rate of 278 mA is representative of the power drawn by an NB-IoT radio, the discharge rate of 100 mA is representative of the power drawn by a LoRa radio, a discharge rate of 10 mA is representative of the power drawn by a BLE radio, and discharge rate of 1 mA is representative of the power drawn by an NFC radio. Specifically, the discharge curves in FIG. 1A were obtained from batteries comprising four zinc-manganese dioxide cells. These batteries were discharged at the ambient temperature of 23° C. The cells were printed on a patterned substrate, with the total battery thickness being less than 1 millimeter. The footprint of each cell was less than 122 millimeters by 130 millimeters. It should be noted that this form factor is particularly suitable for smart label applications. Overall, FIG. 1A illustrates a lot more capacity is available at lower discharge rates. As such, when the voltage profile drops below a threshold for a high-power radio, the battery can be still used for operating a low-power radio. It should be noted that smart labels may include other (non-radio components, e.g. sensors), which have very low power consumption (e.g., a microamp level current).

Without being restricted to any specific theory, it is believed that various electrochemical factors can impact the discharge capabilities of a battery. For example, a high discharge rate can cause the passivation of active material particles, especially in zinc batteries. More specifically, zinc particles can dissolve at high discharge rates causing a release of various byproducts. These byproducts can passivate the remaining zinc particles. In some examples, a battery can take hours, days, and even weeks before another high-rate discharge pulse can be applied, which may be referred to as a relaxation period. In some examples, higher discharge rates cause diffusion limitations in the negative and positive electrodes. As such, some portions of the electrode active materials can remain unused or underutilized.

Figure 1B:
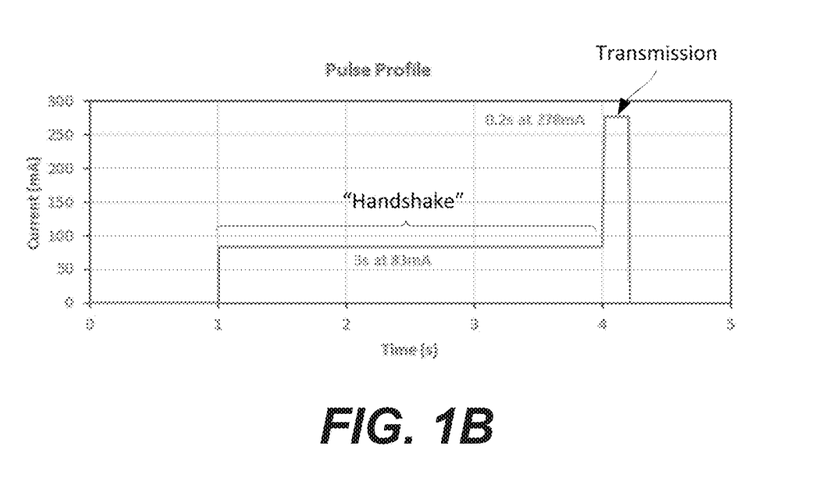

In some examples, wireless radios are configured to perform periodic/cyclic operations. For example, every few minutes or hours, a radio attempts to form a communication channel, effectively searching for nearby signals from other radio gateways, phones, or base stations available for communication over the forward and reverse channels. This part of the overall communication process may be referred to as a handshake. If the communication channel is formed, the radio then can complete data transmission. FIG. 1B illustrates power requirements for an NB-IoT radio during such handshake and transmission stages.

Figure 1C:
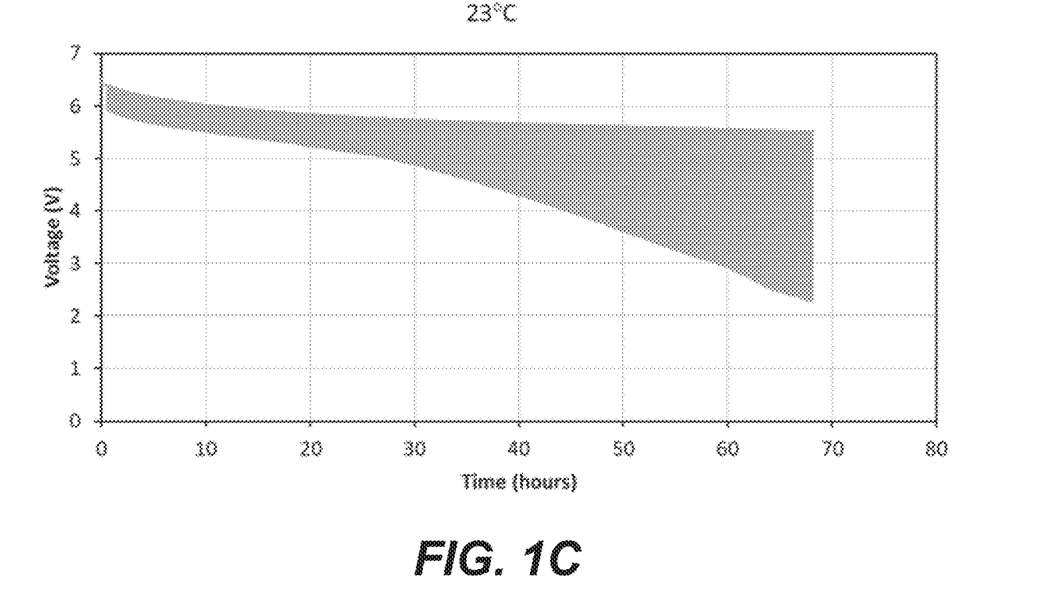
FIGS. 1C, 1D, and 1E illustrate the performance of printed batteries comprising four zinc-manganese dioxide cells at 23° C., 60° C., and −20° C.
Figure 1D:
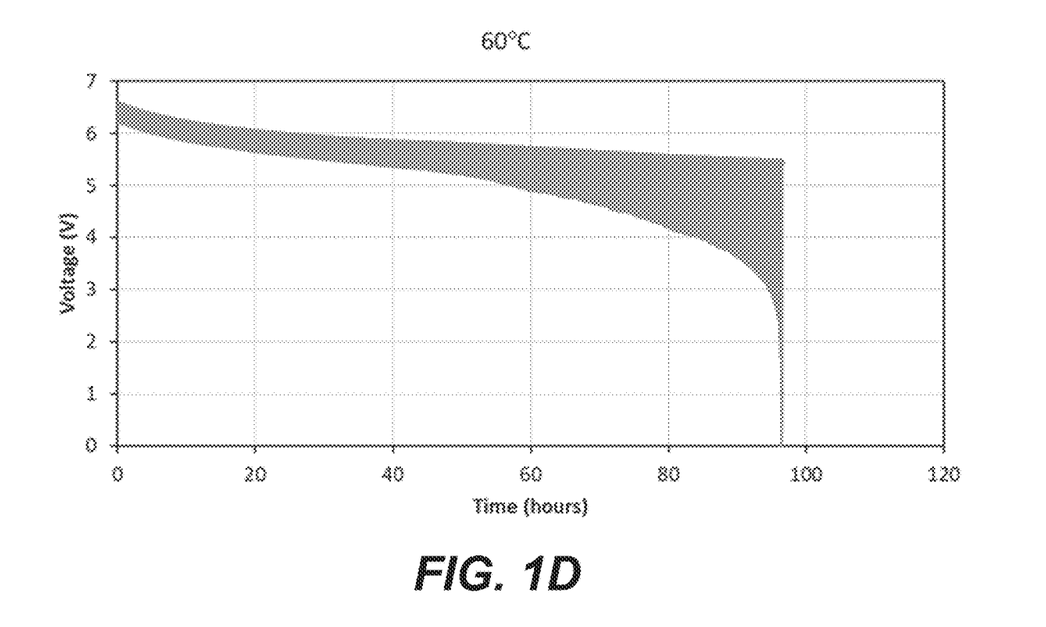
Figure 1E:
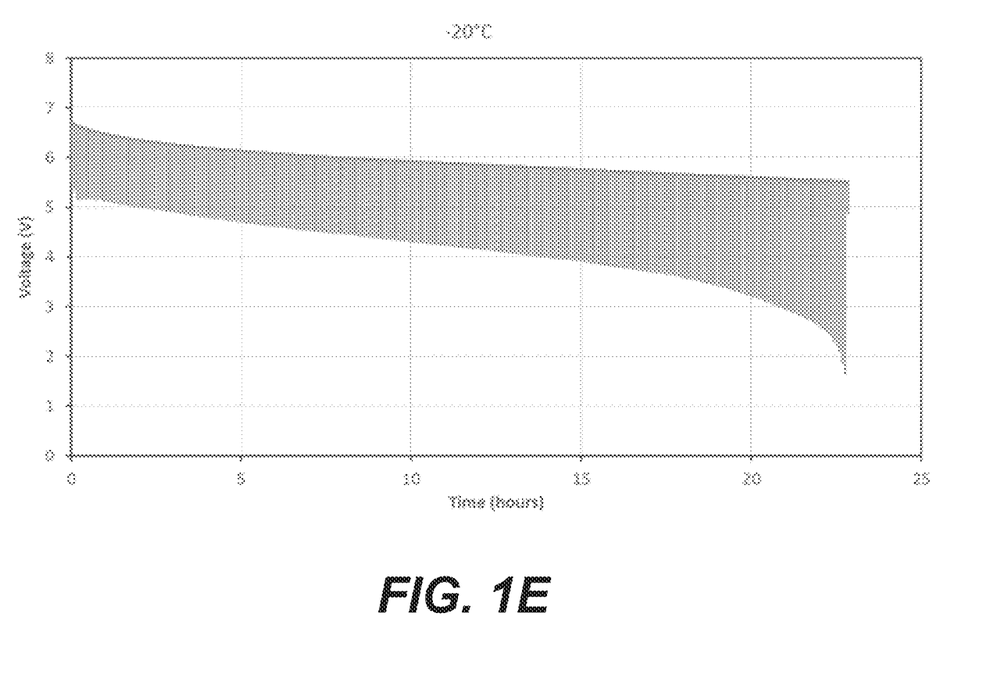

As noted above, various environmental factors, such as temperature, can impact the power output and available discharge capacity of a battery. FIGS. 1C, 1D, and 1E illustrate the performance of printed batteries comprising four zinc-manganese dioxide cells at 23° C., 60° C., and −20° C., which cover a typical operating range of smart labels. In this example, the discharge profile, shown in FIG. 1B, was applied to each cell every 5 minutes. These results illustrate that the battery was able to support 700 NB-IoT transmissions at 23° C., 800 transmissions at 60° C., and 150 transmissions at −20° C.

Smart Label Examples

Figure 2:
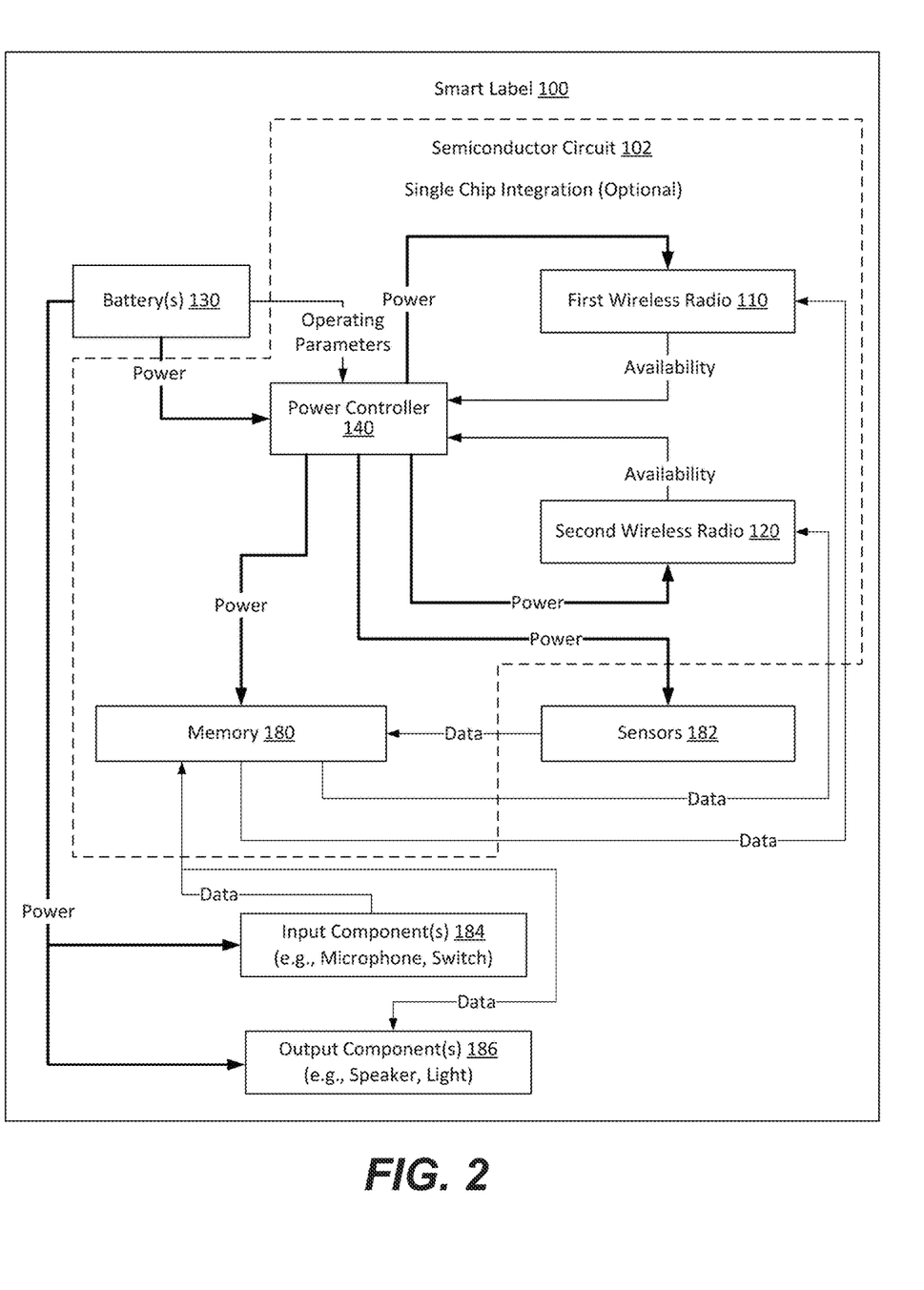
FIG. 2 is a schematic illustration of a smart label comprising a battery, a first wireless radio, a second wireless radio, and other components, in accordance with some examples.

FIG. 2 is a schematic illustration of smart label 100, in accordance with some examples. Smart label 100 comprises battery 130, first wireless radio 110, and second wireless radio 120. Both first wireless radio 110 and second wireless radio 120 are powered by battery 130. In some examples, various other components of smart label 100 shown in FIG. 2 and described below are also powered by battery 130. Second wireless radio 120 has a higher power requirement than first wireless radio 110. For example, second wireless radio 120 is an NB-IoT radio, while first wireless radio 110 is one of an NFC radio, a BLE radio, or a LoRa radio. In general, each of first wireless radio 110 and second wireless radio 120 can be either an NFC radio, a BLE radio, a LoRa radio, and an NB-IoT radio. One having ordinary skill in the art would recognize that the power requirement of the NB-IoT radio is the highest in this list, followed by the LoRa radio, which is followed by the BLE radio and, finally, by the NFC radio. In some examples, smart label 100 includes additional wireless radios, which may be different from first wireless radio 110 and second wireless radio 120.

Battery 130 is configured to selectively power first wireless radio 110 or second wireless radio 120 based on at least one or more operating parameters of battery 130. Some examples of these battery operating parameters include, but are not limited to, OCV, temperature, Coulomb counter output, SOH, and sensor readings (e.g., accelerometer, pressure sensor). For example, sensor readings can be used to detect if smart label 100 is in transit or, more specifically, in a particular kind of transit (e.g., air transit, train transit, vehicle transit, last-mile delivery). These factors indicate the power output capabilities of battery 130. For example, a higher OCV generally corresponds to a higher power output capability (e.g., due to a higher SOC). A higher temperature may also correspond to a higher power output capability. However, the operation of battery 130 may need to be limited upon reaching a certain upper-temperature threshold (e.g., to prevent overheating of battery 130). A Coulomb counter indicates the current SOC, and a higher SOC generally corresponds to a higher power output capability. A SOH may be represented by a voltage drop during the last power-drawn pulse, while a higher voltage drop corresponding to a lower power output capability. It should be noted that in addition to the battery operating parameters, various other parameters may be used to selectively power first wireless radio 110 or second wireless radio 120, such as data availability, communication schedule, communication channel availability, and the like.

Figure 3A:
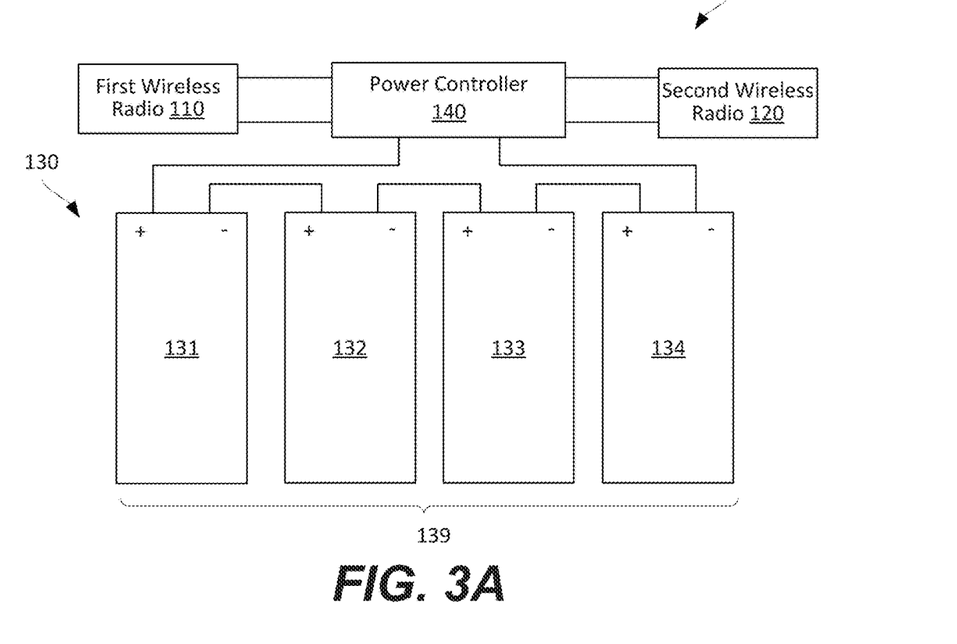
FIGS. 3A-3E are schematic illustrations of a smart label, showing various arrangements and connections of multiple battery cells for powering two wireless radios, in accordance with some examples.

First wireless radio 110 or second wireless radio 120 may be power directly by battery 130 or, in some examples, by power controller 140. FIG. 3A illustrates one example of using power controller 140. In this example, battery 130 comprises four battery cells 139, interconnected in series. For example, each battery cell may have an operating voltage of 1.5V. As such, the total operating voltage of battery 130 is 6.0V. Power controller 140 is connected to battery 130 and is configured to apply the full battery voltage (e.g., when powering second wireless radio 120) or to step down this battery voltage to a lower voltage (e.g., when powering first wireless radio 110). For example, first wireless radio 110 is a BLE radio with an operating voltage range of 1-2V. A voltage step-down function is needed to power first wireless radio 110 in this example. In the same or other examples, second wireless radio 120 is a NB-IoT radio with an operating voltage range of 3-6V. The NB-IoT radio can be powered without any or with a much lower voltage stepdown. It should be noted that the operating cell voltage may reduce (e.g., below the 1.5V level) as battery cells 139 reach lower SOC levels, requiring less voltage step-down functionality. The FIG. 3A example allows discharging all battery cells 139 in a uniform manner (e.g., regardless of the energy consumed by either radio). For example, battery cells 139 may have the same state of charge regardless of the number of times either radio was used for data transmission. Furthermore, power controller 140 requires only minimal switching functionality and a step-down voltage function (e.g., connecting a resistor). These simple power control functions allow reducing the size (e.g., thickness and footprint) of smart label 100 and more efficiently use the capacity of battery 130 (e.g., voltage step-down functionality is more efficient than voltage step-up functionality).

Figure 3B:
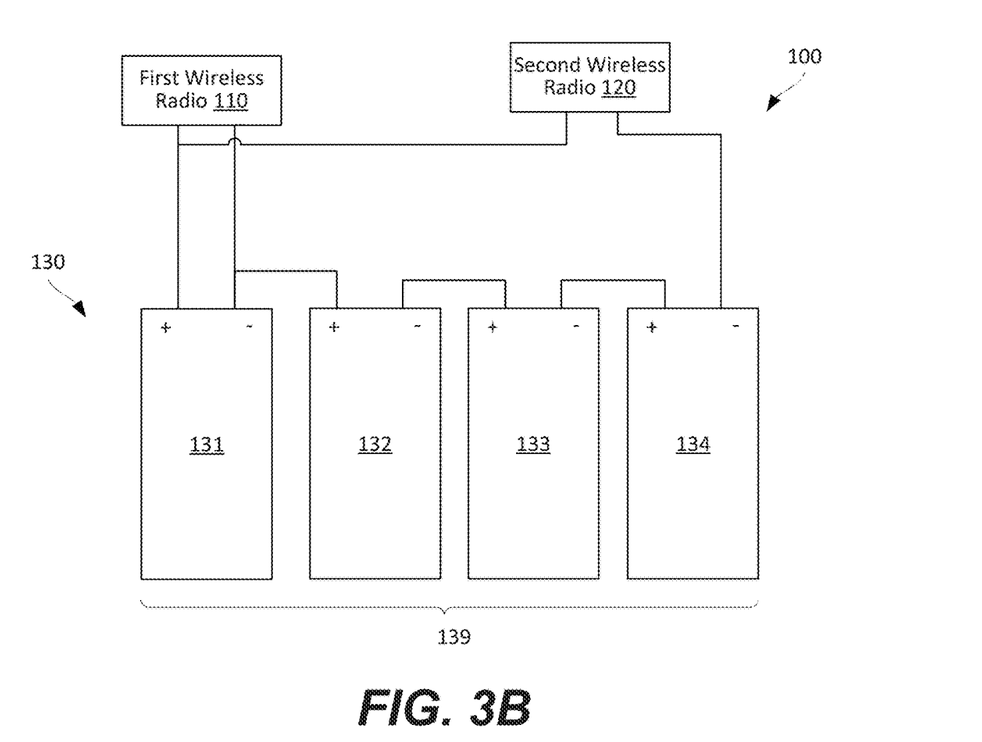

FIG. 3B illustrates another example of smart label 100 that does not use any power controllers. In this example, four battery cells 139 are also interconnected in series. This in-series assembly is then directly connected to second wireless radio 120. In other words, second wireless radio 120 experiences a combined voltage of four battery cells 139. However, first battery cell 131 is only connected to first wireless radio 110 and experiences only the voltages of first battery cell 131. Therefore, first wireless radio 110 is only powered by first battery cell 131, while second wireless radio 120 is powered by all four battery cells 139. While first battery cell 131 is used to power both first wireless radio 110 and second wireless radio 120, it should be noted that the power consumption of first wireless radio 110 can be a lot smaller than that of second wireless radio 120. For example, a BLE radio requires only 3-15 mW for its operation, while an NB-IoT radio requires 1-2 W (or 200-300 times more). As such, the impact of the BLE radio on the discharge of first battery cell 131 will be minimal in comparison to the NB-IoT radio. Furthermore, eliminating a power controller reduces the cost and size of smart label 100 while improving the battery capacity utilization.

Figure 3C:
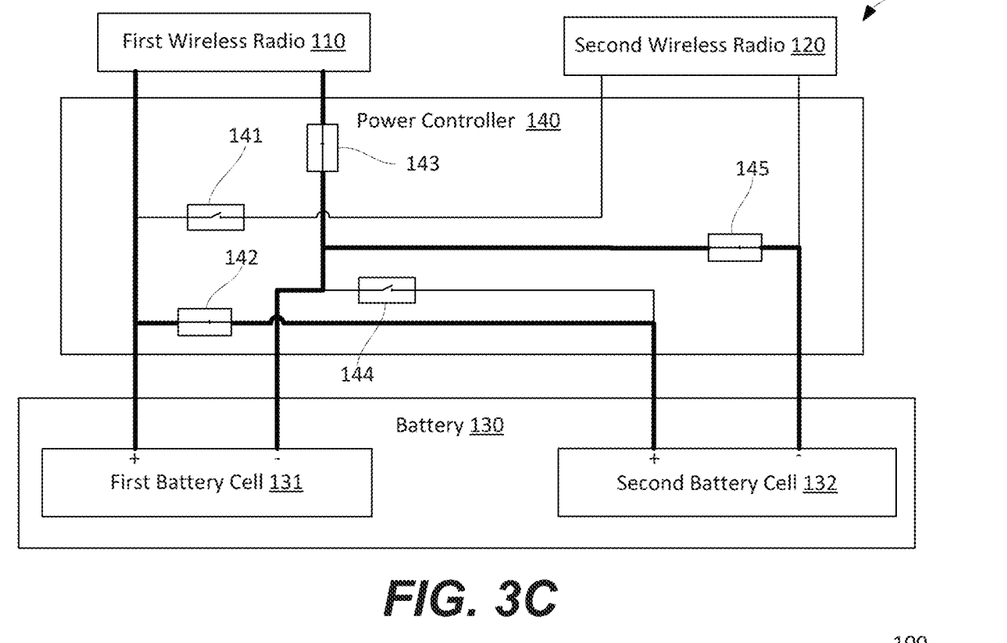
Figure 3D:
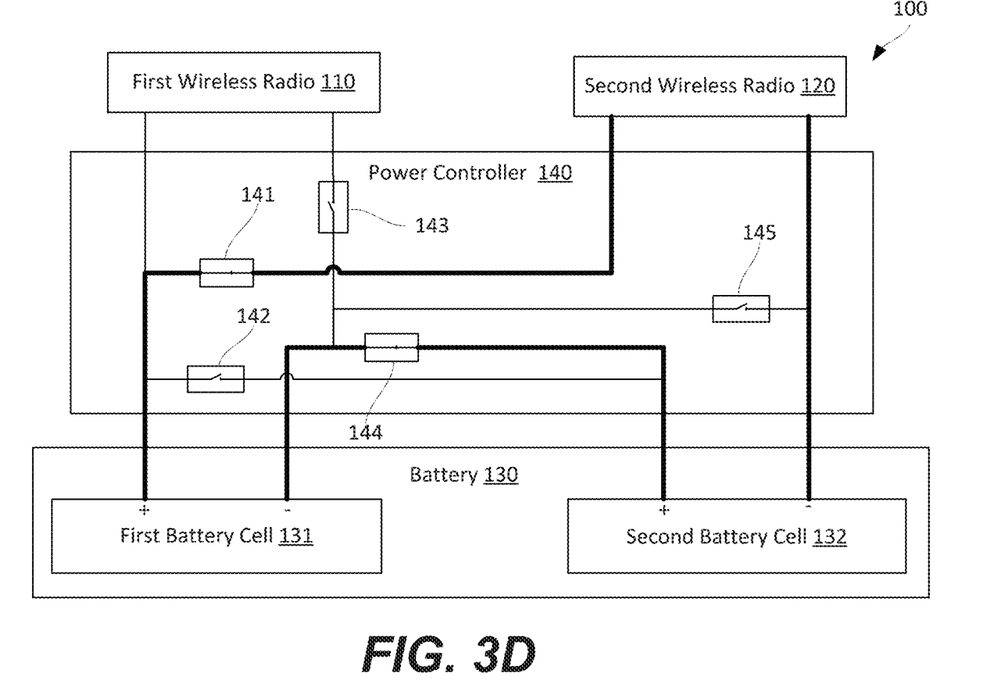

FIGS. 3C and 3D illustrate an example of using power controller 140 to manage connections between battery 130 and each of first wireless radio 110 and second wireless radio 120. Power controller 140 comprises five switches that determine which wireless radio is powered and which battery cells are used to power this radio. While FIGS. 3C and 3D illustrate battery 130 comprising two battery cells, one having ordinary skills in the art would recognize that any number of battery cells can be controlled in this manner. The number of wireless radios, the number of battery cells, and connection options collectively determine the number and position of switched in power controller 140.

FIG. 3C illustrates a state of power controller 140 where first wireless radio 110 is connected to first battery cell 131 and second battery cell 132, with these two cells being connected in parallel with each other. Second wireless radio 120 is disconnected from first battery cell 131 and second battery cell 132. In this state, first switch 141 and fourth switch 144 are disconnected/open, while second switch 142, third switch 143, and fifth switch 145 are connected/closed. If needed, second battery cell 132 can be disconnected by opening switch 142 and/or fifth switch 145. In some examples, power controller 140 can have additional switches (not shown) for disconnecting first battery cell 131 while powering first wireless radio 110 with second battery cell 132 or vice versa (disconnecting second battery cell 132 while powering first battery cell 131).

FIG. 3D illustrates a state of power controller 140 where second wireless radio 120 is connected to first battery cell 131 and second battery cell 132, with these two cells being connected in series thereby combining the voltage of these cells to power second wireless radio 120. First wireless radio 110 is disconnected from first battery cell 131 and second battery cell 132. In this state, first switch 141 and fourth switch 144 are connected/closed, while second switch 142, third switch 143, and fifth switch 145 are disconnected/open.

Figure 3E:
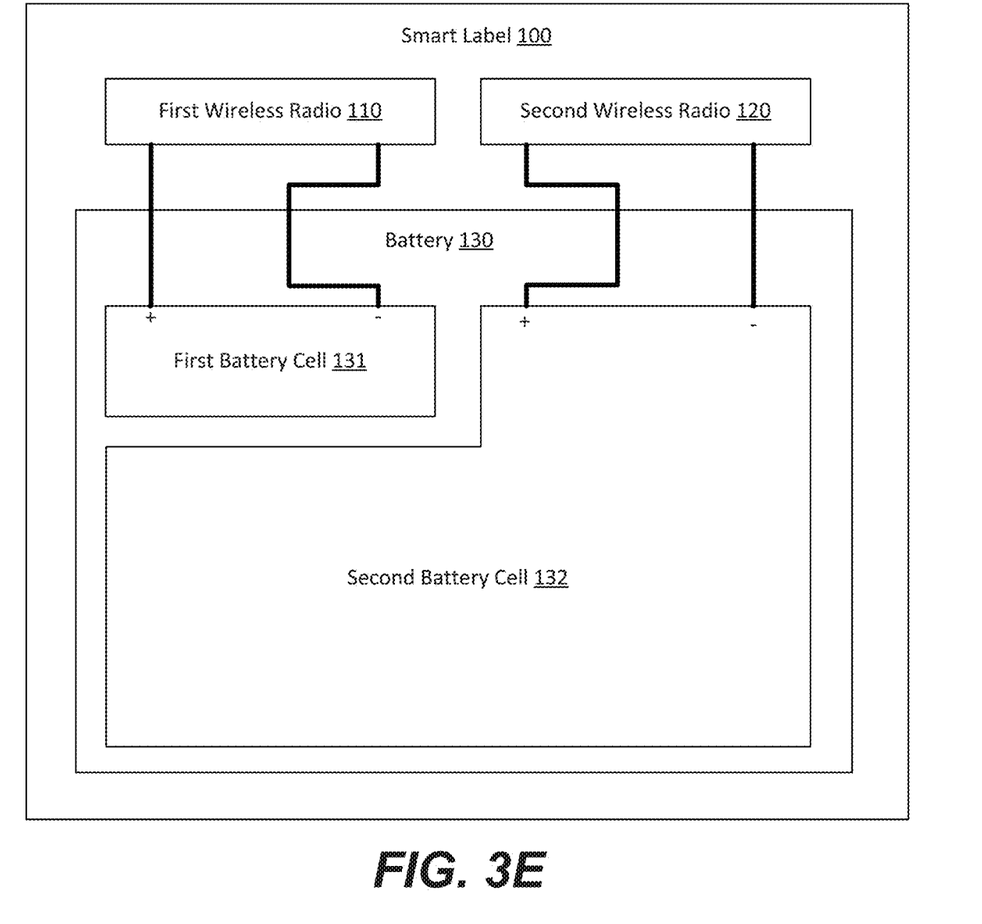

FIG. 3E illustrates another example in which smart label 100 does not use a power controller. In this example, battery 130 comprises two battery cells that have different sizes. Specifically, first battery cell 131 is smaller than second battery cell 132 and is used to power first wireless radio 110. Second battery cell 132 is larger and is used to power second wireless radio 120. Because of the larger size, second battery cell 132 can support larger discharge currents than first battery cell 131 and provide higher power. The voltage of first battery cell 131 and second battery cell 132 may be the same or different. For example, second battery cell 132 may have multiple sets of electrodes interconnected in series to provide a higher voltage.

Overall, in some examples, smart label 100 comprises power controller 140. When present, power controller 140 is configured to selectively power first wireless radio 110 or second wireless radio 120 based on the operating parameters received at least in part from battery 130. Additional examples include communication channel availability for each of first wireless radio 110 and second wireless radio 120. For example, first wireless radio 110 and second wireless radio 120 may periodically check for the availability of their respective communication channels, which is described as a "handshake" with reference to FIG. 1B above. If only one channel is available, then the data transfer is performed using this channel. In some examples, when both channels are available, power controller 140 may select one or both channels for the data transfer. For example, this selection may depend on the remaining battery capacity (e.g., using a lower-power wireless radio when the battery capacity is below a set threshold), a data type that needs to be transferred, and other factors.

Referring to FIG. 2, in some examples, smart label 100 comprises one or more sensors 182. These sensors 182 can be powered by battery 130. Some examples of sensors 182 include, but are not limited to, thermocouple, a humidity sensor, a pressure sensor, an altimeter, an accelerometer, a drop sensor, a package-integrity sensor, a label identifier, a global positioning sensor GPS, an interrupt sensor (e.g., for detecting the integrity of the package), a conductivity sensor (e.g., to measure the wetness), a proximity sensor, a radiation sensor, a position sensor, a photoelectric sensor, a particle sensor, a motion sensor, a level sensor, a leak sensor, a moisture sensor, a humidity sensor, a gas sensor, a chemical sensor, a force sensor, a fire sensor, an electrical sensor, and a contact sensor. In the same or other examples, smart label 100 also comprises memory 180 configured to store data from sensor 182. For example, memory 180 aggregates various data from sensors 182 and then transmits this data to first wireless radio 110 and/or second wireless radio 120 for external data transfer. Memory 180 can be powered by battery 130. In some examples, sensor 182 can measure resistance to determine the temperature.

In some examples, smart label 100 comprises input component 184, such as a microphone, a switch, and the like. Input component 184 can be powered by battery 130. Input component 184 receives external input (e.g., from a user), which can include various commands (e.g., to respond, to supply available data, to start collecting data, to add new data, to initiate communication, and the like). For example, input component 184 can receive and interpret a voice command, such as "Are you Ok?", "Was the temperature in spec?", "When were you shipped?".

In some examples, smart label 100 comprises output component 186, such as a speaker, a light, and a display. Output component 186 can be powered by battery 130. Output component 186 can provide output that can be directly interpreted by a user. Some output examples include, but are limited to, turning on a light, displaying a message (e.g., text, warning, and the like), and producing voice output. In some examples, the display displays a uick Response code (QR code). The QR code can convey information about the shipping history, information of the sensors output over a period of time, information about the content of the package, sender or receiver information, or a encode a link to this information. The display may also show the state-of-charge or state-of-health of battery 130.

Referring to FIG. 2, in some examples, various components, e.g., first wireless radio 110, and second wireless radio 120, can be integrated into the same semiconductor chip 102. Other components that can be integrated into this semiconductor chip 102 are power controller 140, memory 180, and/or sensors 182. Other integration aspects (e.g., current collectors of battery 130 used as antennas of first wireless radio 110, and second wireless radio 120) are described above.

In some examples, smart label 100 is formed in a traditional rectangular shape and size, e.g., 4"×6", 4"×4", or 6"×6" size. Smart label 100 can also be circular in shape, which is beneficial for some applications (e.g., putting on the top of drums). In some examples, smart label 100 can be flexible or conformal to be applied to the side of the drums or bottles.

Battery Examples

Various types of battery 130 can be used in smart labels 100. Some examples include, but are not limited to zinc batteries, sodium batteries, or lithium and lithium-ion batteries. In some examples, battery 130 has a total thickness of less than 3 millimeters or, more specifically, less than 2 millimeters. With such small thickness, battery 130 or, more generally, smart label 100 do not protrude too far from shipment containers (to which this smart label 100 is attached) and is less likely to be damaged or torn off during the shipping process. In some examples, battery 130 is flexible, and can be bending around a 3" core (e.g., a 3" core is typically used for containing rolls of labels). Battery 130 can be disposable and not classified as dangerous goods (e.g., zinc batteries). For comparison, lithium or lithium-ion batteries of certain size are classified as dangerous goods and can have various shipping restrictions. The operating temperature range of battery 130 can range from −40° C. to +60° C. or, more specifically, from −20° C. to +60° C. (e.g., to be able to transmit the signal in a variety of environmental conditions).

Figure 4A:
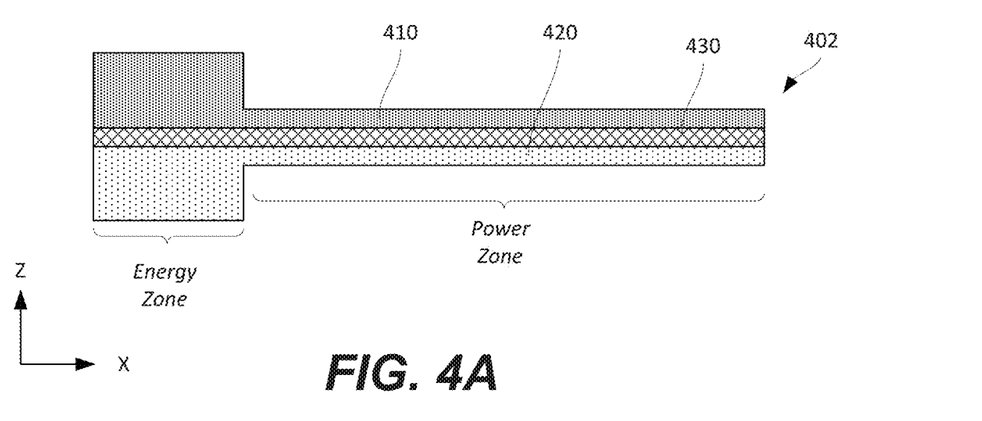
FIGS. 4A and 4B are schematic cross-sectional side views of a multi-modal battery cell, in accordance with some examples.
Figure 4B:
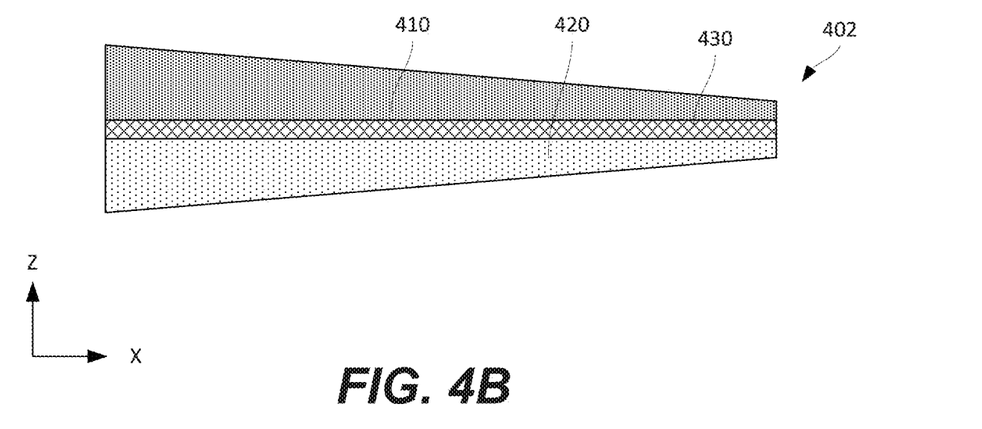

In some examples, battery 130 comprises multi-modal battery cell 402 as, e.g., is schematically shown in FIGS. 4A and 4B. Multi-modal battery cell 402 comprises first electrode 410 and second electrode 420. First electrode 610 and second electrode 420 may have a varying thickness and/or a varying composition. For example, FIG. 4A illustrates an example where each electrode has a thinner portion (e.g., having a larger area) and a thicker portion (e.g., having a smaller area). These thicker portions provide large energy storage, occupying only a small portion of the total area. However, due to the small area, the power rating may be also small (suitable to power first wireless radio 110 but not second wireless radio 120). On the other hand, the thinner portion can provide a larger power (suitable to power first wireless radio 110 or second wireless radio 120). In some examples, the electrode thickness variation is abrupt (e.g., as shown in FIG. 4A) or gradual (e.g., as shown in FIG. 4B). Different electrode thicknesses of multi-modal battery cell 402 can be used to achieve uniform thickness across the entire footprint of smart label 100. For example, a thinner portion of multi-modal battery cell 402 can be stacked with other components of smart label 100 (e.g., circuitry) collectively yielding the same thickness as the thicker portion of multi-modal battery cell 402. From an electrical perspective, the thicker part of multi-modal battery cell 402 is beneficial because this part stores more energy per volume and allows for longer battery life in low drain mode (e.g., a sleep mode, low power transmissions). The thin part of multi-modal battery cell 402 has higher power capability and can be used for supporting high power transmissions.

Multi-modal battery cell 402 with variable electrode thickness may be used to maintain the overall label thickness below a set threshold, while effectively filling the volume available for smart label 100. For example, thinner electrode portions may overlap with other components of smart label 100, such as sensors, memory, wireless radios, and the like. Furthermore, multi-modal battery cell 402 provides more efficient space utilization in comparison to, e.g., multiple batteries that require interconnections, separation, and other features which occupy space and add to cost.

In some examples, a thin "high power" positive and/or negative electrode formulation may include more of the conductive carbons to have lower resistance and lower voltage drop during high power pulse. For example, the thicker electrode may have between 1% to 2% by weight of conductive carbons whereas the thinner electrode may have between 2% to 5% by weight of conductive carbons. More generally, the weight ratio of conductive carbons in the thinner electrode can be between 1.5 and 5 times greater than in the thicker electrode. The electrode with less conductive carbons has a higher energy density (due to a higher weight ratio of active materials) and, therefore, a higher capacity per volume. The difference in the capacity per area of the thinner electrode and thicker electrode can be 1.5 and 3 times. For example, the capacity per area of the thin electrode can be less than 4 mAh/cm$^2$, while the capacity per area of the thicker electrode can be greater than 6 mAh/cm$^2$.

In some examples, battery 130 is a printed battery. Using printing techniques to form various battery components, such as positive active materials layers, electrolyte layers, and negative active material layers provide unique opportunities for battery design and for achieving specific performance characteristics of these batteries. For example, printing an active material layer on a current collector establishes a robust electro-mechanical connection between this active material layer and the current collector. Printing involves depositing a layer of ink onto a base, which may be a substrate or another printed layer. Similarly, printing an electrolyte layer over an active material layer establishes a robust ionic connection between these layers by reducing voids and gaps between these layers. Finally, printing allows making batteries with various shapes (not possible with the conventional wound or stacked batteries). This shape flexibility opens doors to various integration opportunities.

In some examples, printing allows fabricating batteries with specific features (not possible with other fabricating techniques), such as electrodes having different thicknesses within a given footprint. Variable-thickness electrodes are difficult to make with conventional blade-over-roll or slot-die coating methods, which are commonly used in battery manufacturing. On the other hand, printing methods described herein can form variable-thickness electrodes in the following ways. For example, first-stage screen printing can be used to form a thin electrode having a first footprint. This electrode is dried before proceeding to the next stage. In a second-stage screen printing, another layer can be formed over the previously-printed electrode. The second-stage screen printing can be performed using the same screen mesh and thickness. The second-stage screen printing can be performed using the same ink or a different ink (e.g., ink with a lower composition of conductive carbons). In some examples, a thin portion of the overall electrode can be printed first, while a thicker portion can be printed next (or side-by-side) using screens of different mesh and thickness. In some examples, these thin-thick printing can be performed in two steps with stencils or with one custom stencil that has a different thickness within a printing footprint.

Antenna Integration Examples

Figure 5A:
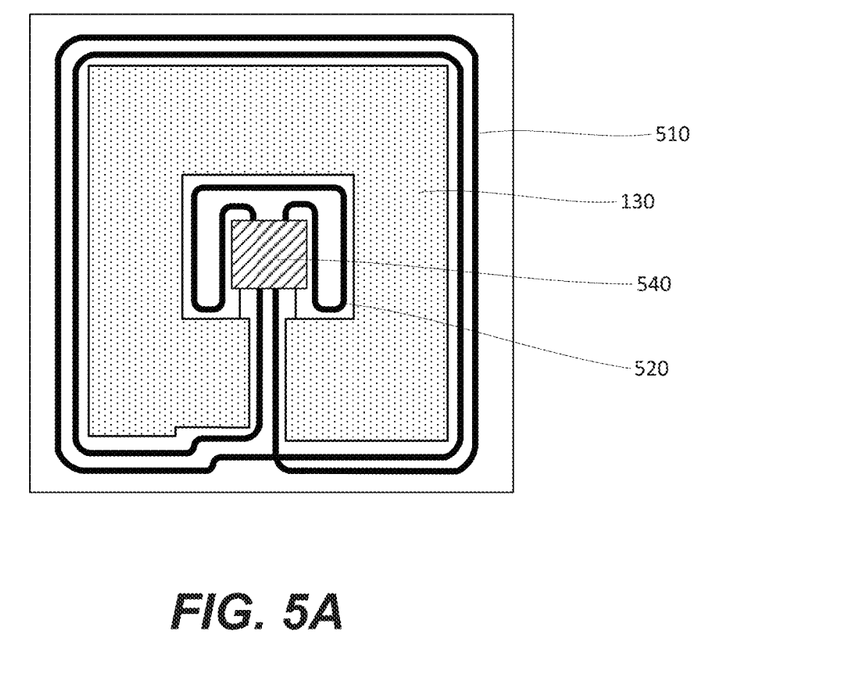
FIG. 5A is a schematic cross-sectional side view of a smart label illustrating specific integrations of a battery and two antennas, in accordance with some examples.

FIG. 5A is a schematic illustration of smart label 100 comprising battery 130 and two wireless radios. The wireless radios share chip 540 (power by battery 130) but have different antennas, e.g., first antenna 510 and second antenna 520. Battery 130 is positioned between first antenna 510 and second antenna 520 thereby preventing signal interference between these antennas. In some examples, first antenna 510, second antenna 520, and a current collector of one battery electrodes are formed in the same operation, e.g., by patterning the same metal foil sheet.

In some examples, the current collectors of one or both battery electrodes are operable as antennas of one or both wireless radios. More specifically, the electrodes may be stacked such that the distance between the two current collectors is defined by the combined thickness of the negative active material layer, electrolyte layer, and positive active material layer.

Figure 5B:
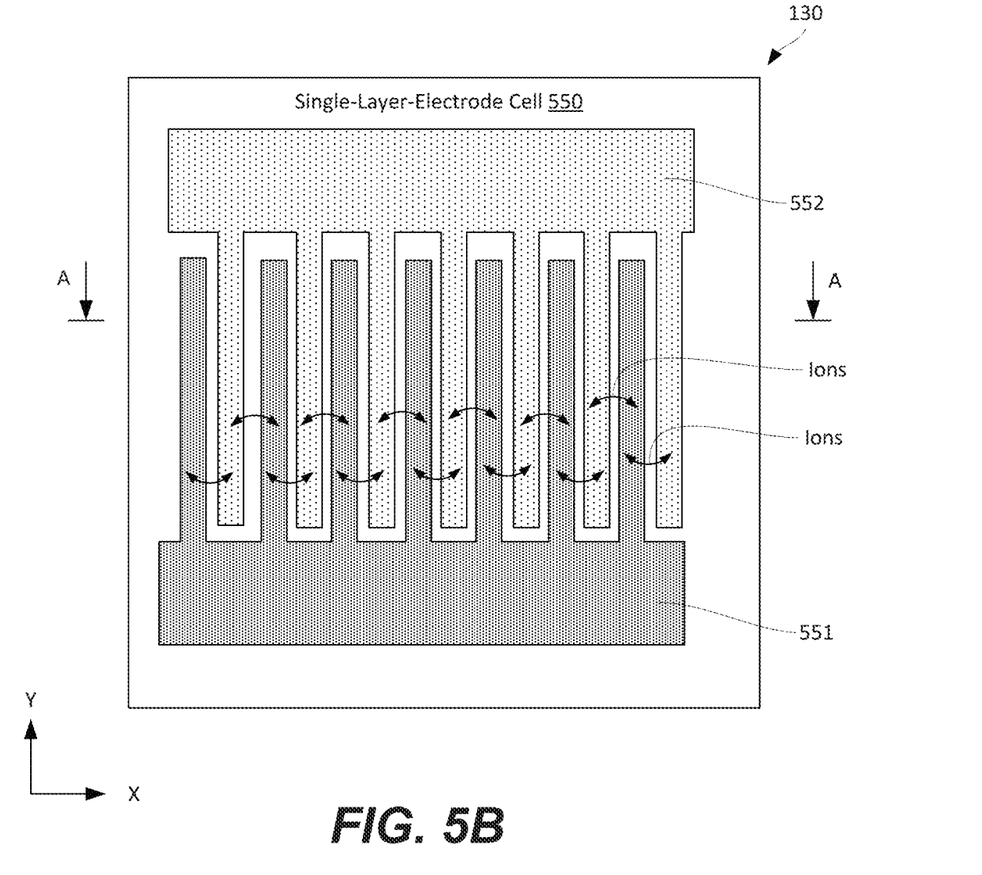
FIGS. 5B and 5C are schematic cross-sectional top and side views of a single-layer-electrode cell, in which the current collectors are used as antennas of wireless radios, in accordance with some examples.
Figure 5C:
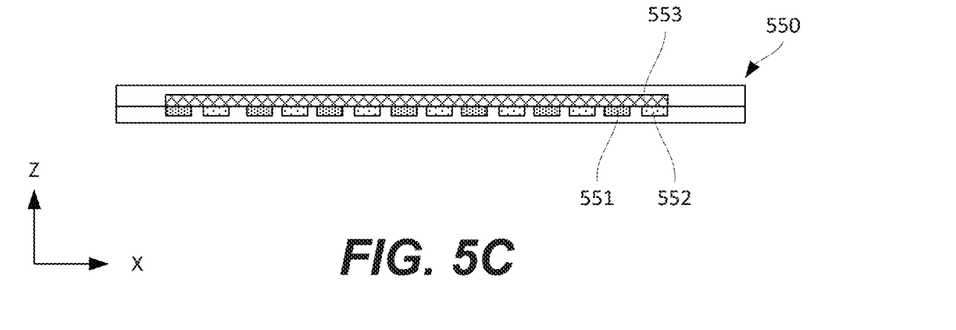

Alternatively, battery 130 comprises single-layered-electrode battery cell 550 as, e.g., is schematically shown in FIGS. 5B and 5C. Single-layered-electrode battery cell 550 comprises first electrode 551 and second electrode 552, positioned in one plane (e.g., parallel to the X-Y plane). FIG. 5B illustrates first electrode 551 and second electrode 552 as interdigitated structures, which helps to reduce the ion distance between any pair of adjacent electrodes. One having ordinary skill in the art would appreciate that this distance is inverse proportional to the power rate capabilities of the battery cell. At least one of first electrode 551 or second electrode 552 is operable as an antenna of first wireless radio 110 or second wireless radio 120. In general, first electrode 551 and second electrode 552 can take any shape while maintaining proximity to each other. The ionic transport between the active material layers is provided by electrolyte layer 553 disposed over first electrode 551 or second electrode 552 as, e.g., is schematically shown in FIG. 5C.

Smart Label Mesh Network Examples

Figure 6:
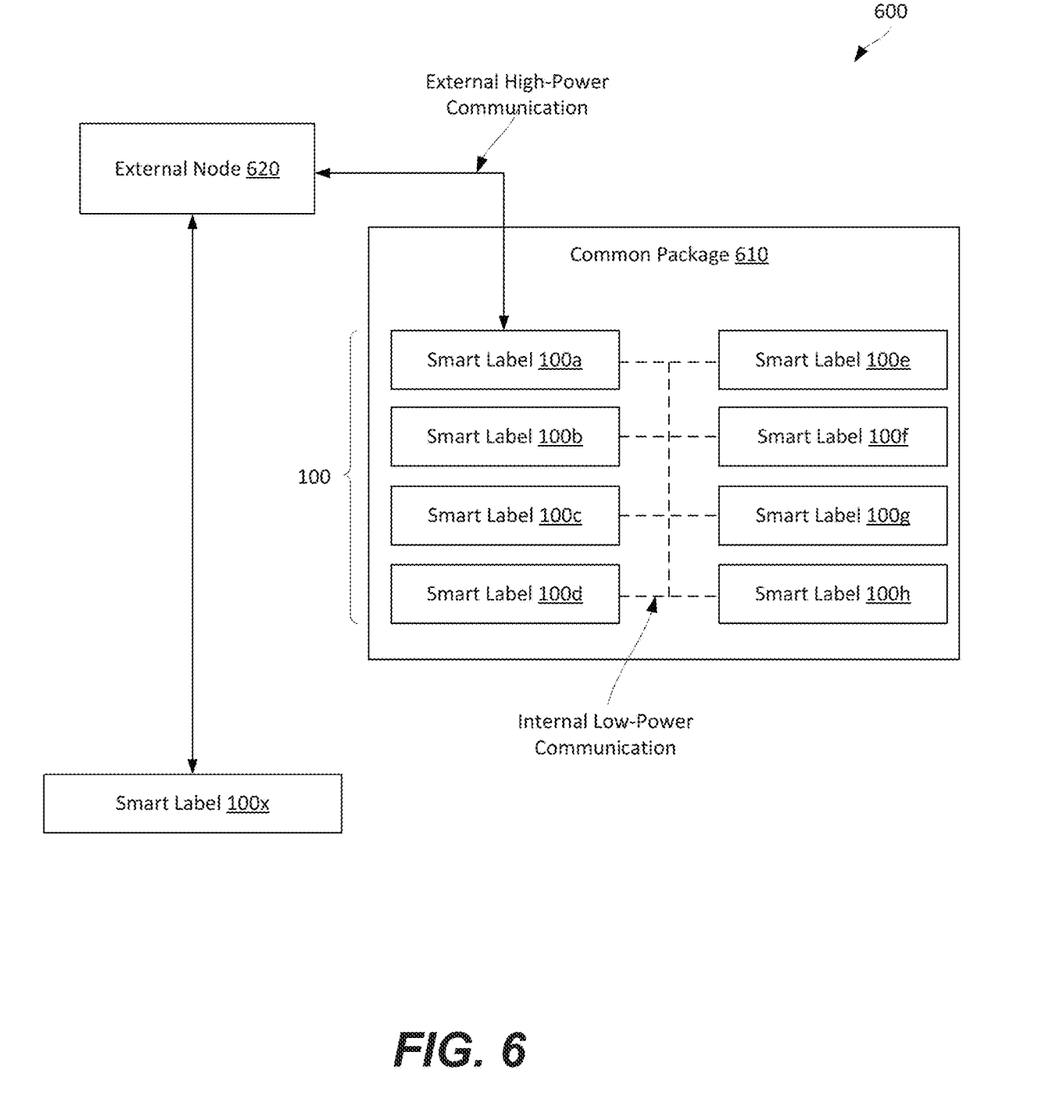
FIG. 6 is a schematic illustration of a mesh network formed by multiple smart labels, which may be positioned on a common package, in accordance with some examples.

When multiple smart labels 100 are positioned at the same location (e.g., as a part of the same package, such as a pallet), these smart labels 100 may form an internal communication network, which may be referred to as a mesh network. Because of the proximity of smart labels 100, this internal communication can be performed using a lower-power wireless radio at each smart label 100 thereby reducing the power consumption at each smart label 100. FIG. 6 is a schematic illustration of mesh network 600 formed by multiple smart labels 100, in accordance with some examples. The dotted line illustrated the communication among these smart labels 100 within this mesh network 600.

In some examples, smart labels 100 may designate one or more labels (which may be referred to as dynamic communicators), e.g., smart label 100a in FIG. 6, for external communication on behalf of all smart labels. In some examples, any label among smart labels in mesh network 600 can be designated as a dynamic communicator. A dynamic communicator can transmit data in both directions or simply broadcast data available at this label. Returning to the example in FIG. 6 where smart label 100a is designated as a dynamic communicator, smart label 100a can use its high-power radio to reach external node 620, which may be not as close to smart label 100a. Smart label 100a may aggregate the data from all labels in mesh network 600 and transmit this data (on behalf of all labels) to external node 620. In some examples, smart label 100a can delegate the responsibility for the external communication and/or the data aggregation to another label, e.g., if the battery of smart label 100a drops below a certain state of charge.

In some examples, mesh network 600 may monitor whether all smart labels 100 remain present in mesh network 600. For example, mesh network 600 may report once one label (e.g., smart label 100x in FIG. 6) is no longer a part of mesh network 600. For example, the package carrying this label may be separated from the rest of the packages. In some examples, smart label 100x can establish a direct communication channel with external node 620 to report being separated from mesh network 600. One example of external node 620 is a phone, which can be a gateway.

Examples of Smart Label Operations

Figure 7:
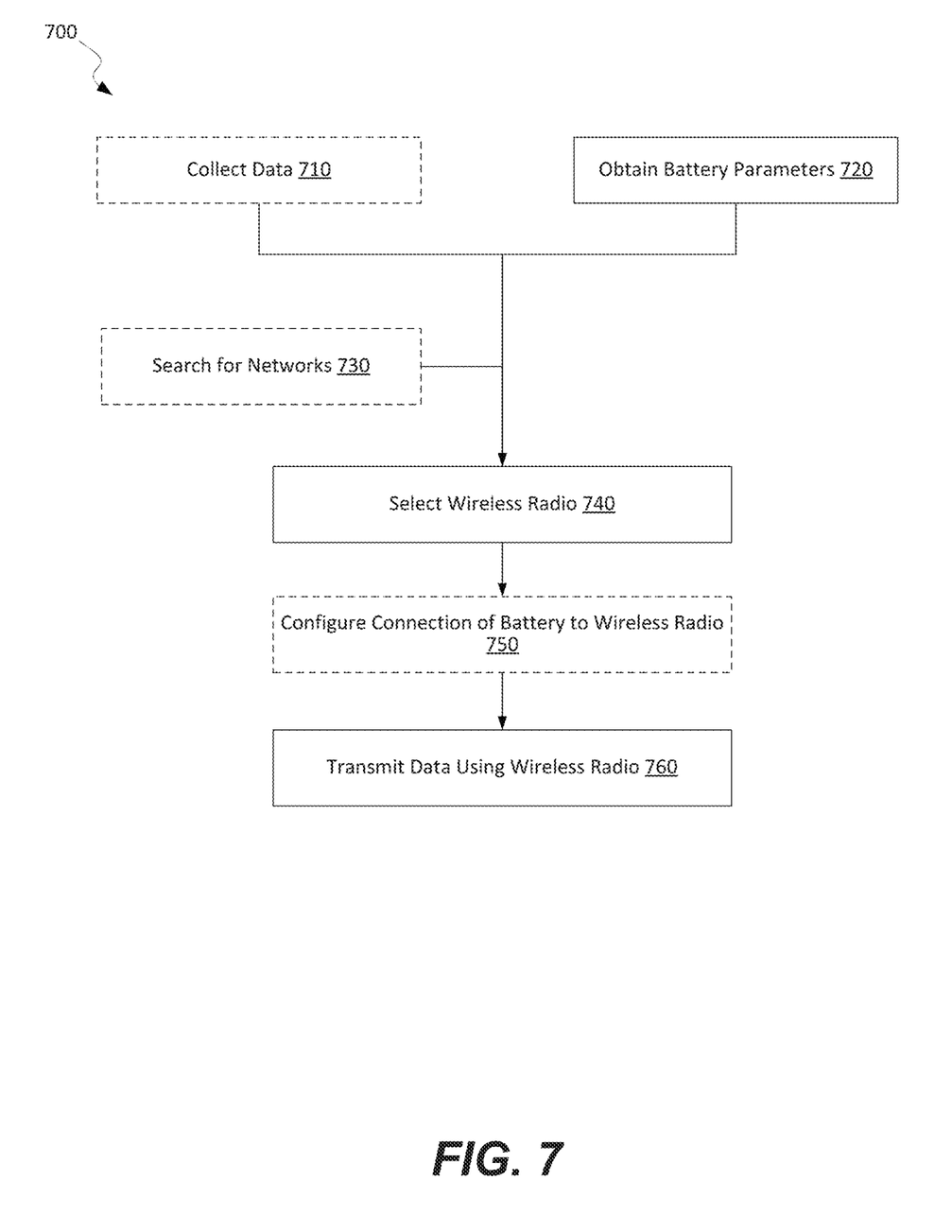
FIG. 7 is a process flowchart corresponding to a method of operating a smart label, in accordance with some examples.

FIG. 7 is a process flowchart corresponding to method 700 of operating smart label 100, in accordance with some examples. Various examples of smart label 100 are described above. Smart label 100 can be applied to a package and, in some examples, activated, e.g., by allowing battery 130 to power other components of smart label 100. In some examples, this activation is performed by a user (e.g., after applying smart label 100 to a package).

In some examples, method 700 comprises collecting (block 710) various data at smart label 100. Some examples of collected data include, but are not limited to, the temperature history of smart label 100, humidity history of smart label 100, acceleration history of smart label 100, pressure history of smart label 100, light history of smart label 100, package integrity history of smart label 100, position history of smart label 100. Various types of sensors and/or input devices may be used for this operation. It should be noted that this data collection is an optional operation. In some examples, smart label 100 has a dataset (e.g., previously recorded data, but not directly collected by smart label 100) available for transmission. Smart label 100 may have information on the type of product contained in the package, material safety data, serial numbers of the products, information required by the customs (e.g., Harmonized Tariff Codes, country of origin information, or the destination information). This information can be broadcasted via wireless protocol on a periodic basis, or while passing by gateways, or under particular circumstances, such as crossing an international border, or taking off a plane.

In some examples, method 700 comprises obtaining (block 720) battery parameters, such as the battery OCV, temperature, Coulomb counter output, SOH, and the number of expected transmissions left. These parameters may be later used to determine the capability of battery 130 to power one or both first wireless radio 110 or second wireless radio 120. For example, if the battery OCV drops below a certain threshold, battery 130 may not be able to power second wireless radio 120 but is still able to power first wireless radio 110. As an example, battery 130 with an OCV below 2.5-3.0V may not be able to power tNBIoT transmissions but can power LoRa transmissions or BTLE transmissions. Battery 130 with OCV below 2.0V may not be able to power LoRa transmission but can power BTLE transmissions.

In some examples, method 700 comprises searching (block 720) for communication networks available for first wireless radio 110 and/or second wireless radio 120. For example, each wireless radio may periodically send a communication request and wait for a response before going back to sleep. This operation is described as a "handshake" with reference to FIG. 1B.

Method 700 comprises selecting (block 740) a wireless radio from first wireless radio 110 or second wireless radio 120 for communication, wherein first wireless radio 110 or second wireless radio 120. This selection is performed based on, e.g., battery operating parameters listed above (the battery OCV, temperature, Coulomb counter output, SOH, and internal resistance).

In some examples, method 700 comprises configuring (block 750) the connection between battery 130 and one or both of first wireless radio 110 or second wireless radio 120. Method 700 comprises transmitting (block 760) various data using one or both of first wireless radio 110 or second wireless radio 120.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A smart label comprising:
   a battery comprising multiple battery cells interconnected in series;
   a first wireless radio directly connected to and powered by only one of the multiple battery cells; and
   a second wireless radio directly connected and powered by all of the multiple battery cells operating at a higher voltage and having a higher power requirement than the first wireless radio,
      wherein the battery is configured to selectively and directly power one or both the first wireless radio and the second wireless radio based on operating parameters comprising at least one of an open-circuit voltage (OCV) of the battery, a temperature of the battery, a Coulomb counter output, a state-of-health (SOH) of the battery, and an internal resistance of the battery.

2. The smart label of claim 1, wherein the first wireless radio and the second wireless radio are selected from the group consisting of a near-field communication (NFC) radio, Bluetooth low energy (BLE) radio, a long-range (LoRa) radio, and a narrowband internet of things (NB-IoT) radio.

3. The smart label of claim 1, wherein the battery is selected from the group consisting of a zinc battery, a sodium battery, a lithium battery, and a lithium-ion battery.

4. The smart label of claim 1, further comprising:
   a sensor, powered by the battery and selected from the group consisting of a thermocouple, a humidity sensor, a pressure sensor, an altimeter, an accelerometer, a drop sensor, a package-integrity sensor, a label identifier, and a global positioning sensor (GPS); and
   a memory, powered by the battery and configured to store data from the sensor and to transmit the data to the first wireless radio and the second wireless radio.

5. The smart label of claim 4, further comprising:
   an input component, powered by the battery and selected from the group consisting of a microphone and a switch; and
   an output component, powered by the battery and selected from the group consisting of a speaker and a light, wherein the output component is communicatively coupled to the memory and configured to provide an output representative of the data stored in the memory.

6. The smart label of claim 1, wherein at least one of the multiple battery cells comprises a multi-modal battery cell comprising a first electrode and a second electrode, and
wherein the first electrode and the second electrode have a varying thickness or varying composition.

7. The smart label of claim 1, further comprising a display, powered by the battery and configured to display a QR code.

8. The smart label of claim 1, wherein the battery is flexible.

9. The smart label of claim 1, wherein the battery has a thickness of less than 1 millimeter.

10. The smart label of claim 1, wherein power consumption of the first wireless radio is smaller than power consumption of the second wireless radio.

11. The smart label of claim 1, wherein:
the first wireless radio is a Bluetooth low energy (BLE) radio, and
the second wireless radio is a narrowband internet of things (NB-IoT) radio.

12. A smart label of comprising:
a battery;
a first wireless radio powered by the battery; and
a second wireless radio powered by the battery and having a higher power requirement than the first wireless radio,
wherein the battery is configured to selectively power one or both the first wireless radio and the second wireless radio based on operating parameters comprising at least one of an open-circuit voltage (OCV) of the battery, a temperature of the battery, a Coulomb counter output, a state-of-health (SOH) of the battery, and an internal resistance of the battery,
wherein the battery comprises a single-layered-electrode battery cell comprising a first electrode and a second electrode positioned in one plane, and wherein at least one of the first electrode or the second electrode is operable as an antenna of the first wireless radio or the second wireless radio.

13. A method of operating a smart label comprising a first wireless radio, a second wireless radio, and a battery, the method comprises:
selecting a wireless radio from the first wireless radio or the second wireless radio for communication, wherein:
the battery comprises multiple battery cells interconnected in series,
the first wireless radio is directly connected to and powered by only one of the multiple battery cells,
the second wireless radio is directly connected and powered by all of the multiple battery cells, operating at a higher voltage and having a higher power requirement than the first wireless radio,
the first wireless radio or the second wireless radio is selected based on operating parameters comprising at least one of an open circuit voltage (OCV) of the battery, a temperature of the battery, a Coulomb counter output, a state-of-health (SOH) of the battery, and an internal resistance of the battery; and
transmitting data using the wireless radio, selected from the first wireless radio or the second wireless radio.

14. The method of claim 13, further comprising collecting the data, selected from the group temperature history of the smart label, humidity history of the smart label, acceleration history of the smart label, pressure history of the smart label, light history of the smart label, package integrity history of the smart label, and position history of the smart label.

15. The method of claim 13, wherein the first wireless radio and the second wireless radio are selected from the group consisting of a near-field communication (NFC) radio, Bluetooth low energy (BLE) radio, a long-range (LoRa) radio, and a narrowband internet of things (NB-IoT) radio.

16. The method of claim 13, wherein the battery is selected from the group consisting of a zinc battery, a sodium battery, a lithium battery, and a lithium-ion battery.

17. The method of claim 13, further comprising activating the smart label thereby connecting the battery to each of the first wireless radio and the second wireless radio.

18. The method of claim 13, further comprising obtaining the operating parameters from the battery.

19. The method of claim 13, further comprising searching for communication networks available for the first wireless radio and the second wireless radio.

20. The method of claim 13, wherein the smart label is a part a mesh network formed by multiple smart labels.

* * * * *